US012563411B2

(12) United States Patent
Takada et al.

(10) Patent No.: US 12,563,411 B2
(45) Date of Patent: Feb. 24, 2026

(54) TERMINAL WITH INDEPENDENTLY CONTROLLED RECEIVE BEAMS

(71) Applicant: NTT DOCOMO, INC., Tokyo (JP)

(72) Inventors: Takuma Takada, Tokyo (JP); Hideaki Takahashi, Tokyo (JP); Hiromasa Umeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 359 days.

(21) Appl. No.: 17/635,277

(22) PCT Filed: Aug. 15, 2019

(86) PCT No.: PCT/JP2019/032078
§ 371 (c)(1),
(2) Date: Feb. 14, 2022

(87) PCT Pub. No.: WO2021/029077
PCT Pub. Date: Feb. 18, 2021

(65) Prior Publication Data
US 2022/0295303 A1      Sep. 15, 2022

(51) Int. Cl.
H04W 16/28      (2009.01)
H04L 5/00      (2006.01)
H04W 24/10      (2009.01)

(52) U.S. Cl.
CPC ........... H04W 16/28 (2013.01); H04L 5/0051 (2013.01); H04W 24/10 (2013.01)

(58) Field of Classification Search
CPC .... H04W 16/28; H04W 24/10; H04L 5/0051; H04B 7/088
See application file for complete search history.

(56) References Cited

U.S. PATENT DOCUMENTS

| | | | | |
|---|---|---|---|---|
| 2017/0207845 | A1* | 7/2017 | Moon | H04B 7/088 |
| 2019/0082346 | A1* | 3/2019 | Tang | H04B 7/0626 |
| 2019/0253119 | A1* | 8/2019 | Lo | H04B 7/0695 |
| 2019/0342801 | A1* | 11/2019 | Cui | H04W 72/23 |
| 2020/0162954 | A1* | 5/2020 | Seo | H04W 24/10 |
| 2020/0259618 | A1* | 8/2020 | Yang | H04W 72/0453 |
| 2020/0358514 | A1* | 11/2020 | Landis | H04B 7/0695 |
| 2020/0359422 | A1* | 11/2020 | Xie | H04W 74/0833 |
| 2020/0413309 | A1* | 12/2020 | Zhu | H04W 36/0085 |
| 2021/0044342 | A1* | 2/2021 | He | H04L 5/0051 |
| 2021/0167821 | A1* | 6/2021 | Chen | H04B 7/0617 |
| 2021/0219366 | A1* | 7/2021 | Matsumura | H04B 7/0695 |
| 2021/0258064 | A1* | 8/2021 | Yu | H04B 7/086 |

(Continued)

OTHER PUBLICATIONS

International Search Report issued in PCT/JP2019/032078 on Mar. 17, 2020 (6 pages).

(Continued)

*Primary Examiner* — Liem H. Nguyen
(74) *Attorney, Agent, or Firm* — Osha Bergman Watanabe & Burton LLP

(57)      ABSTRACT

A UE receives a radio signal via a receive beam. The UE controls the receive beam in a first state or in a second state where control of the receive beam is different from that of the first state. The UE executes received power measurement using a synchronization signal block by simultaneously using a plurality of the receive beams in a case of controlling the receive beam in the second state.

5 Claims, 10 Drawing Sheets

(56)                          References Cited

U.S. PATENT DOCUMENTS

2022/0173877 A1*    6/2022   Yang ...................... H04L 5/001

OTHER PUBLICATIONS

Written Opinion of the International Searching Authority issued in PCT/JP2019/032078 on Mar. 17, 2020 (5 pages).

CMCC; "Enhancements on multi-beam operation"; 3GPP TSG RAN WG1 #97, R1-1906522; Reno, USA; May 13-17, 2019 (7 pages).

NTT Docomo, Inc.; "Discussion on multi-beam enhancement"; 3GPP TSG RAN WG1 #97, R1-1906225; Reno, USA; May 13-17, 2019 (24 pages).

ETSI TS 138 133 V15.6.0; "5G; NR; Requirements for support of radio resource management (3GPP TS 38.133 version 15.6.0 Release 15)"; Jul. 2019; (1001 pages).

* cited by examiner

FIG. 2
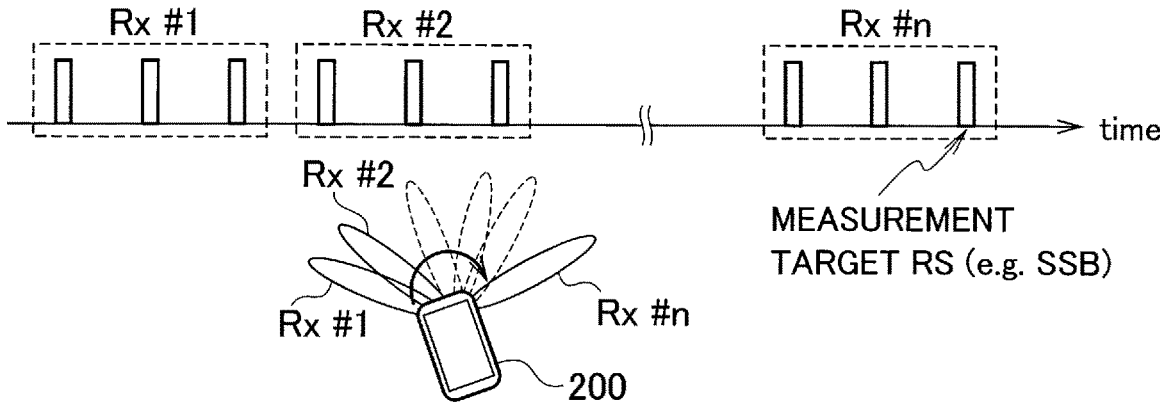
MEASUREMENT
TARGET RS (e.g. SSB)
FIG. 3
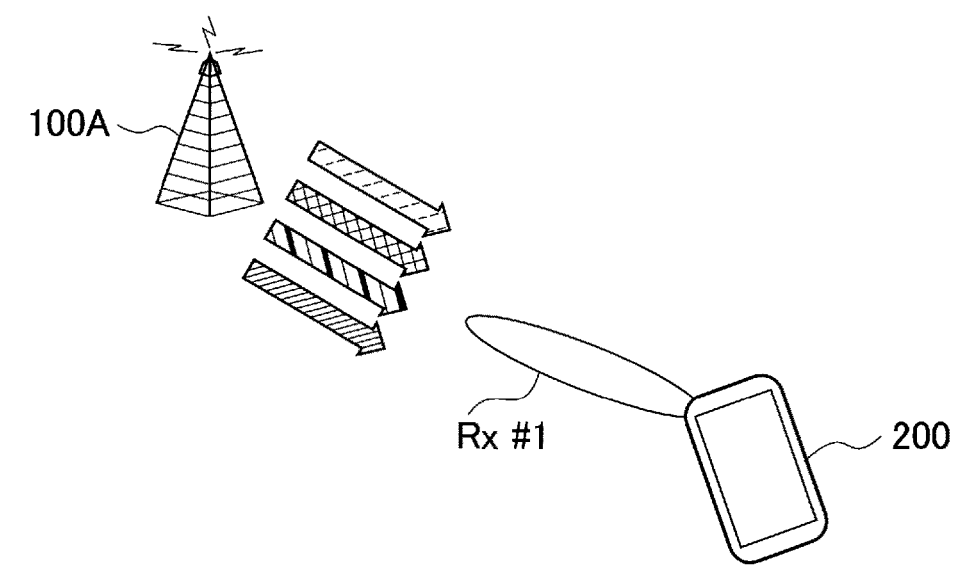
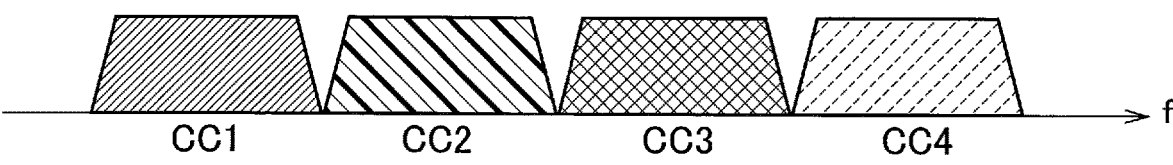

Serving cell
(e.g. SCS for data = 120 kHz)

Measured cell
(e.g. SCS for SSB = 240 kHz)

SSB#1  #2  #3  ......

0.125 ms

⬚ ... SYMBOL INDICATING THAT TRANSMISSION AND RECEPTION OF DATA CHANNEL AND CONTROL CHANNEL ARE IMPOSSIBLE

▨ ... SYMBOL INDICATING THAT TRANSMISSION AND RECEPTION OF DATA CHANNEL AND CONTROL CHANNEL ARE POSSIBLE

FIG. 6

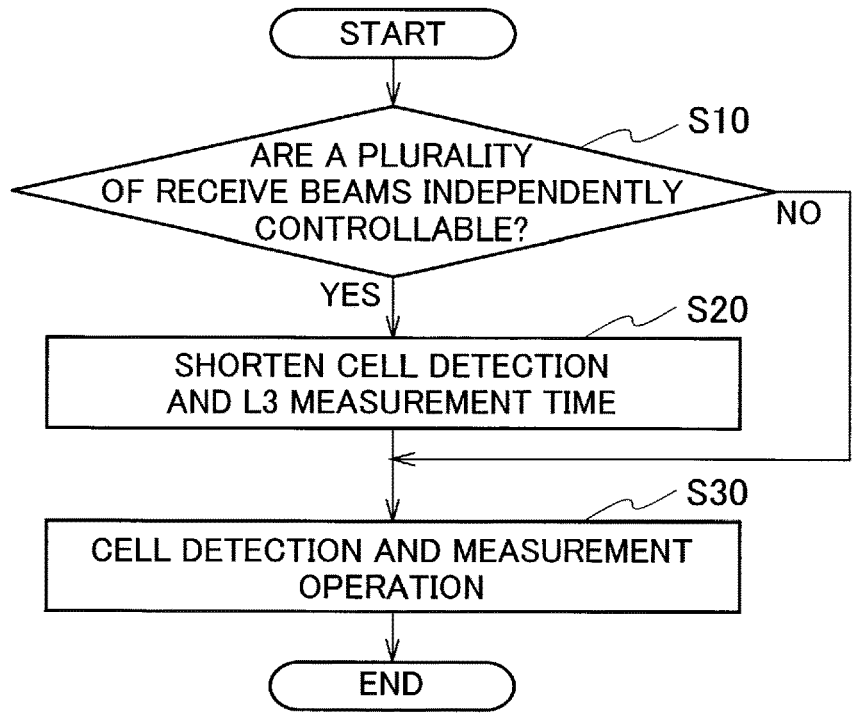

START

S10

ARE A PLURALITY
OF RECEIVE BEAMS INDEPENDENTLY
CONTROLLABLE?

NO

YES

S20

SHORTEN CELL DETECTION
AND L3 MEASUREMENT TIME

S30

CELL DETECTION AND MEASUREMENT
OPERATION

END

FIG. 7

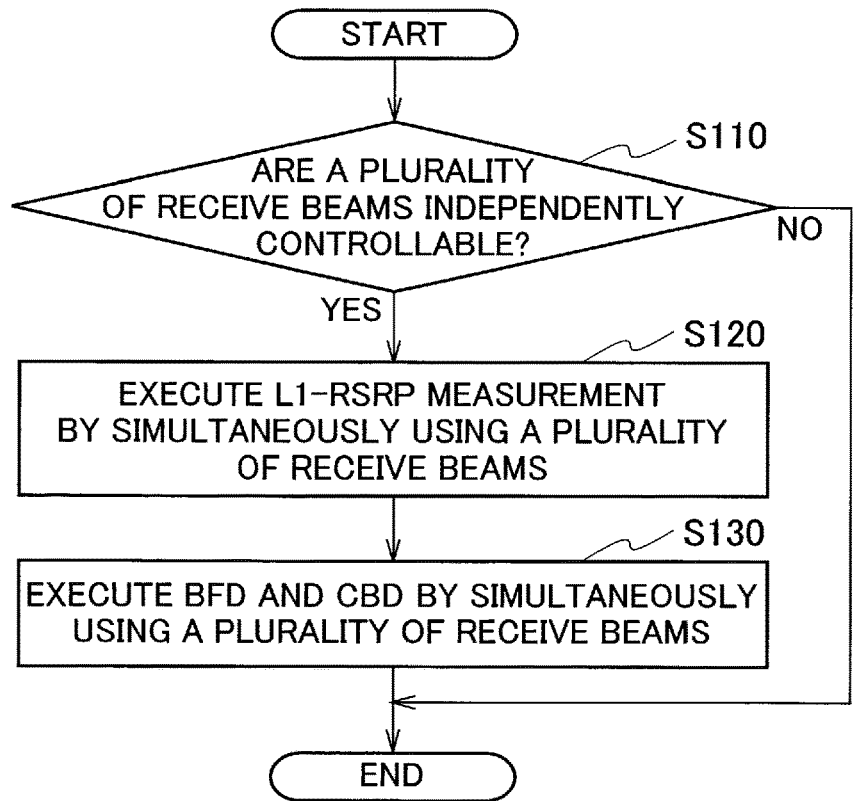

START

S110

ARE A PLURALITY
OF RECEIVE BEAMS INDEPENDENTLY
CONTROLLABLE?

NO

YES

S120

EXECUTE L1-RSRP MEASUREMENT
BY SIMULTANEOUSLY USING A PLURALITY
OF RECEIVE BEAMS

S130

EXECUTE BFD AND CBD BY SIMULTANEOUSLY
USING A PLURALITY OF RECEIVE BEAMS

END

200

Band A

Band B 205A   205B 206   200

Band A

Band B

FIG. 10B

TERMINAL WITH INDEPENDENTLY CONTROLLED RECEIVE BEAMS

TECHNICAL FIELD

The present invention relates to a terminal that transmits and receives a radio signal, and particularly to a terminal capable of using a plurality of receive beams.

BACKGROUND ART

The 3rd generation partnership project (3GPP) has specified long term evolution (LTE), and has also advanced specification for LTE-Advanced (hereinafter referred to as LTE including LTE-Advanced) for the purpose of further speeding up LTE, and 5th generation mobile communication system (also called 5G, new radio (NR), or next generation (NG)).

In Release 15 of the 3GPP, in a case of using frequency range 2 (FR2) (24.25 GHz to 52.6 GHz), also in a terminal (user equipment (UE)), beamforming that forms a directivity pattern of a radio wave and increases or decreases an antenna gain for a specific direction is assumed.

In addition, in radio resource management (RRM) of FR2 such as cell quality measurement using a reference signal (RS) and radio link monitoring (RLM), it is premised that the terminal (user equipment (UE)) sequentially switches a direction of a single receive beam to execute measurement while searching for a direction in which reception characteristics of the receive beam become good (Non-Patent Literature 1).

In addition, in FR2, in a case of executing carrier aggregation (CA) that bundles and uses a plurality of component carriers (CCs), it is premised that all the CCs are transmitted from the same direction (same place) so that the terminal having control capability of the receive beam as described above can operate appropriately, and in FR2, only an intra-band CA is defined.

CITATION LIST

Non-Patent Literature

Non-Patent Literature 1: 3GPP TS 38.133 V15.6.0, 3rd Generation Partnership Project; Technical Specification Group Radio Access Network; NR; Requirements for support of radio resource management (Release 15), 3GPP, June 2019

SUMMARY OF INVENTION

Since Release 16, the application of an inter-band CA is also studied in FR2, such that it is assumed that a plurality of CCs are transmitted from different directions (different places).

In order to cope with such an environment, it is assumed that the terminal needs to independently control a plurality of receive beams and direct each receive beam to a different direction.

However, according to specifications of Release 15, in the cell quality measurement, the RLM and the like, described above, the terminal is not necessarily efficiently operated.

Therefore, the present invention has been made in view of such a situation, and an object of the present invention is to provide a terminal capable of realizing an efficient operation such as measurement even in a case of independently controlling a plurality of receive beams and directing each receive beam to a different direction.

An aspect of the present disclosure is a terminal (UE 200) including: a reception unit (radio reception unit 220) that receives a radio signal via a receive beam; and a control unit (control unit 250) that controls the receive beam in a first state or in a second state where control of the receive beam is different from that of the first state, in which the control unit executes received power measurement using a synchronization signal block by simultaneously using a plurality of the receive beams in a case of controlling the receive beam in the second state.

An aspect of the present disclosure is a terminal (UE 200) including: a reception unit (radio reception unit 220) that receives a radio signal via a receive beam; and a control unit (control unit 250) that controls the receive beam in a first state or in a second state where control of the receive beam is different from that of the first state, in which the control unit simultaneously executes received power measurement using a channel state information-reference signal for a plurality of component carriers in a case of controlling the receive beam in the second state.

An aspect of the present disclosure is a terminal (UE 200) including: a reception unit (radio reception unit 220) that receives a radio signal via a receive beam; and a control unit (control unit 250) that controls the receive beam in a first state or in a second state where control of the receive beam is different from that of the first state, in which the control unit simultaneously executes transmission and reception of a data channel and received power measurement in a case of controlling the receive beam in the second state.

An aspect of the present disclosure is a terminal (UE 200) including: a reception unit (radio reception unit 220) that receives a radio signal via a receive beam; and a control unit (control unit 250) that controls the receive beam in a first state or in a second state where control of the receive beam is different from that of the first state, in which the control unit executes measurement using a beam failure detection-reference signal by simultaneously using a plurality of the receive beams in a case of controlling the receive beam in the second state.

An aspect of the present disclosure is a terminal (UE 200) including: a reception unit (radio reception unit 220) that receives a radio signal via a receive beam; and a control unit (control unit 250) that controls the receive beam in a first state or in a second state where control of the receive beam is different from that of the first state, in which the control unit simultaneously executes measurement using a beam failure detection-reference signal and channel transmission and reception in a case of controlling the receive beam in the second state.

BRIEF DESCRIPTION OF DRAWINGS

FIG. 2 is a diagram illustrating a reception example of a reference signal (RS) using a single receive beam by a user equipment (UE) 200.

FIG. 3 is a diagram illustrating an operation example of carrier aggregation using a single receive beam by the UE 200.

FIG. 6 is a schematic operation flow of the UE 200 according to operation example 1.

FIG. 7 is a schematic operation flow of the UE 200 according to operation example 2.

FIG. 10B is a diagram illustrating a control example (control example 2) of receive beams by the UE 200 mounted with a plurality of antenna panels.

DESCRIPTION OF EMBODIMENTS

Figure 1:
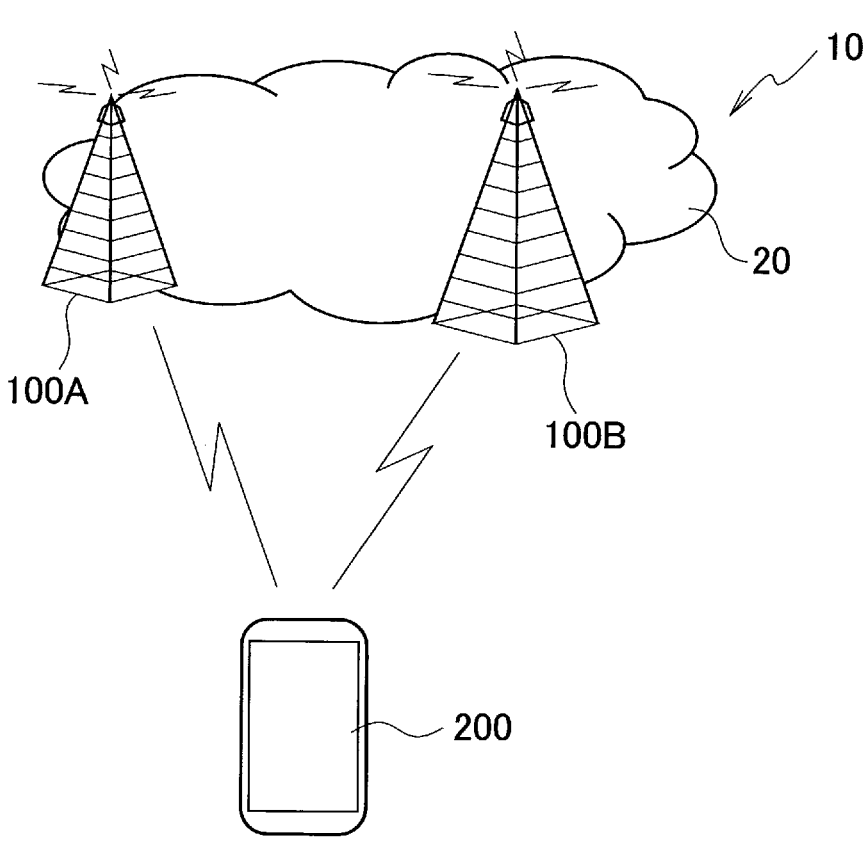
FIG. 1 is an overall schematic configuration diagram of a radio communication system 10.

Hereinafter, embodiments will be described with reference to the drawings. Note that the same functions or configurations will be denoted by the same or similar reference numerals, and a description thereof will be appropriately omitted.

(1) Overall Schematic Configuration of Radio Communication System

FIG. 1 is an overall schematic configuration diagram of a radio communication system 10 according to the present embodiment. The radio communication system 10 is a radio communication system according to 5G new radio (NR), and includes a next generation-radio access network 20 (hereinafter, referred to as NG-RAN 20) and a user terminal 200 (User Equipment 200, hereinafter, referred to as UE 200).

The NG-RAN 20 includes radio base stations 100A and 100B (hereinafter, referred to as gNB 100A and gNB 100B, respectively). Note that a specific configuration of the radio communication system 10 including the numbers of gNBs and UEs is not limited to an example illustrated in FIG. 1.

The NG-RAN 20 actually includes a plurality of NG-RAN nodes, specifically, gNBs (or ng-eNBs), and is connected to a core network (5GC) (not illustrated) according to 5G. Note that the NG-RAN 20 and the 5GC may be simply expressed as networks.

The gNBs 100A and 100B are radio base stations according to 5G, and execute radio communication according to 5G with the UE 200. The gNBs 100A and 100B and the UE 200 can support massive multiple-input multiple-output (MIMO) that generates beams with higher directivity, carrier aggregation (CA) that bundles and uses a plurality of component carriers (CCs), dual connectivity (DC) that simultaneously performs communication between the UE and each of the plurality of NG-RAN nodes, and the like, by controlling radio signals transmitted from a plurality of antenna elements.

The gNBs 100A and 100B notify the UE 200 of transmit beam information applied at the time of transmitting a downlink channel (definition of a channel will be described later), such that the UE 200 can apply a corresponding receive beam. In the present embodiment, the UE 200 can use a single receive beam, but can independently control two or more receive beams and can direct the two or more receive beams to different directions.

Note that beamforming may be any one of analog beamforming that forms directivity by phase control of the plurality of antenna elements (radio frequency (RF) devices) or digital beamforming that performs phase control in a baseband.

FIG. 2 illustrates a reception example of a reference signal (RS) using a single receive beam by the UE 200. In a case of using frequency range 2 (FR2) (24.25 GHz to 52.6 GHz), in radio resource management (RRM) of 3GPP Release 15 (hereinafter, appropriately abbreviated as Release 15), the UE 200 sequentially switches a direction of the single receive beam to Rx #1 to Rx #n to execute measurement of an RS (for example, SSB (SS/PBCH Block)), which is a measurement target, while searching for a direction in which reception characteristics of the receive beam become good. In the example illustrated in FIG. 2, the number of RSs to be received in each Rx period is three, and the UE 200 is testing a total of n receive beams to be directed to different directions.

FIG. 3 is a diagram illustrating an operation example of carrier aggregation using a single receive beam by the UE 200. In the Release 15, in a case where the CA is executed in FR2, the respective CCs (CC1 to CC4) transmitted from the gNB 100A are allocated in the same frequency band so that the UE 200 that sequentially switches the direction of the single receive beam can operate appropriately. That is, in the Release 15, only intra-band CA is defined, such that it is premised that all the CCs are transmitted from the same direction, specifically, from the same place (may be referred to as the same radio base station or the same cell).

In the present embodiment, as described above, the UE 200 can independently control the plurality of receive beams and can direct the plurality of receive beams to different directions, and can thus realize more flexible cell detection, measurement, radio link monitoring, beam management, and CA/DC operations.

In addition, in FR2, time division duplex (TDD) is applied, and only synchronized networks are thus assumed. Furthermore, in the Release 15, it is premised that the UE 200 forms the single receive beam by analog beamforming in a case of using FR2. For this reason, the UE 200 cannot transmit and receive a data channel and a control channel in an SSB symbol to be measured and one symbols before and after the SSB symbol regardless of whether or not to support capability to simultaneously receive different numerologies (may also be replaced with subcarrier spacings (SCSs) or the like). Note that the symbol may also be replaced with an orthogonal frequency division multiplexing (OFDM) symbol, a resource block (RB), or the like.

Figure 4:
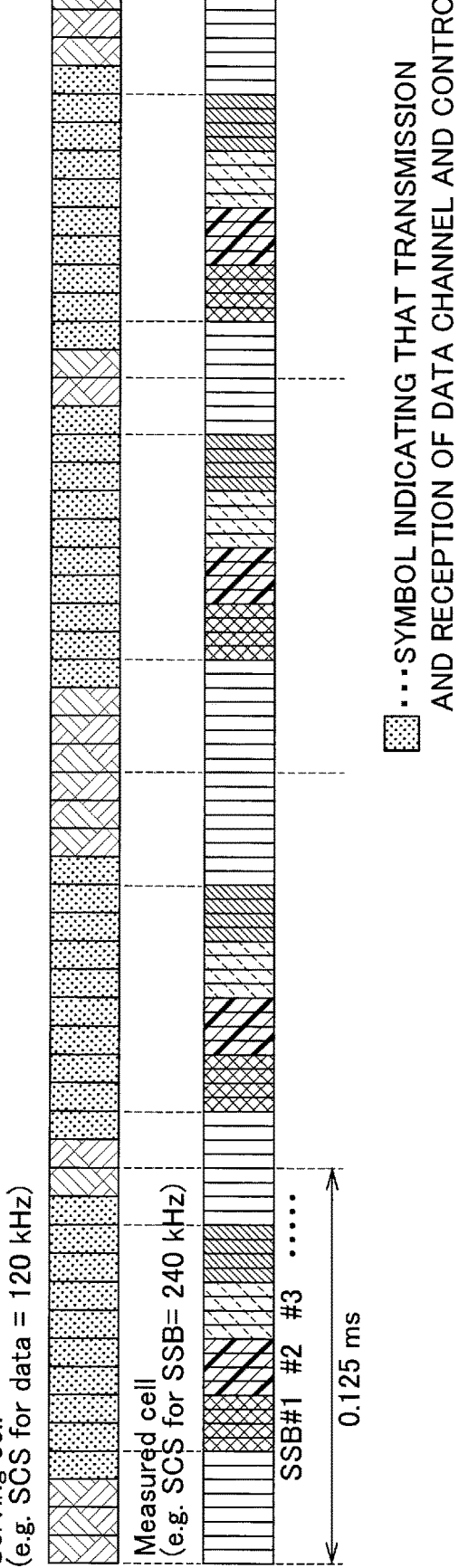
FIG. 4 is a diagram illustrating an example of symbol patterns in which transmission and reception of a data channel and a control channel are possible and impossible.

FIG. 4 illustrates an example of symbol patterns in which transmission and reception of a data channel and a control channel are possible and impossible. In an example illustrated in FIG. 4, an SCS of 120 kHz is used in a serving cell, and an SCS of 240 kHz is used in a cell to be measured. For this reason, in the cell to be measured, one symbol period (symbol length) is halved.

As illustrated in FIG. 4, in symbols of the serving cell corresponding to SSB #1 to SSB #3 of the cell to be measured and one symbols before and after these symbols, the data channel and the control channel cannot be transmitted and received. As such, there is a restriction on scheduling at the time of detecting a cell.

By providing such a restriction on the scheduling, the UE 200 can correctly receive data and control signals via the serving cell even in a case where the UE 200 forms the single receive beam by the analog beamforming. In addition, in the present embodiment, as described later, a plurality of receive beams can be independently controlled and can be directed to different directions, and such a restriction on the scheduling can thus be unnecessary.

(2) Functional Block Configuration of Radio Communication System

Figure 5:
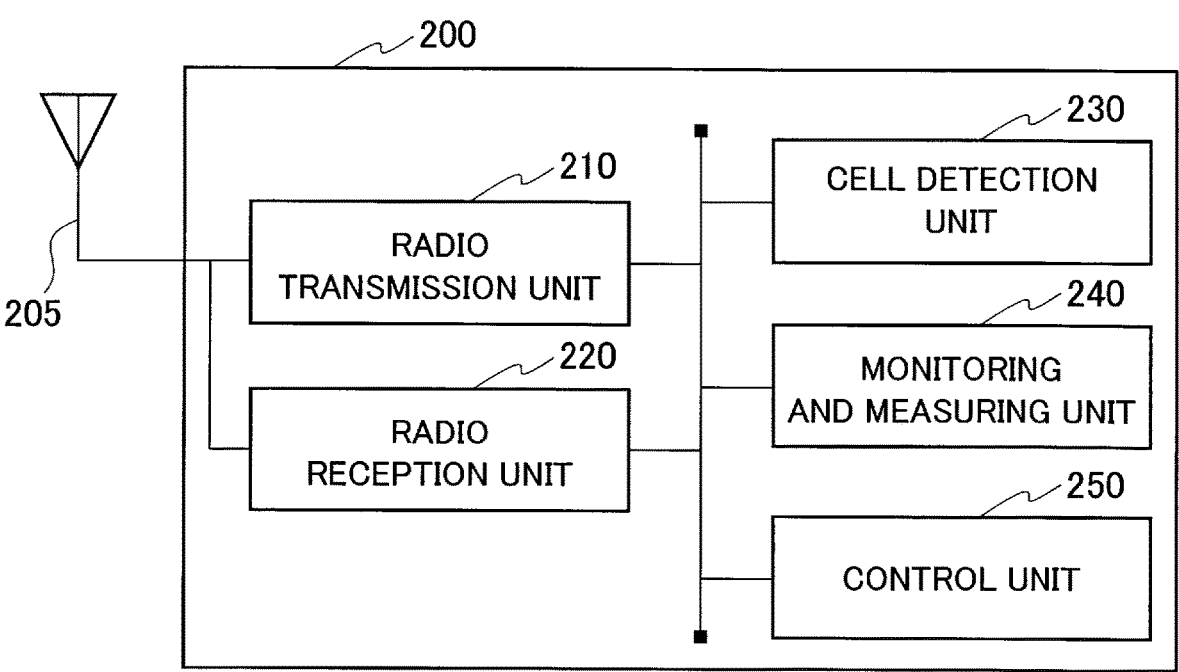
FIG. 5 is a functional block diagram of the UE 200.

Next, a functional block configuration of the radio communication system 10 will be described. Specifically, a functional block configuration of the UE 200 will be described. FIG. 5 is a functional block diagram of the UE 200.

A radio transmission unit 210 transmits an uplink signal (UL signal) according to NR. A radio reception unit 220 receives a downlink signal (DL signal) according to the NR.

Specifically, the radio transmission unit 210 and the radio reception unit 220 execute radio communication via the control channel or the data channel.

The control channel includes a physical downlink control channel (PDCCH), a physical uplink control channel (PUCCH), a physical random access channel (PRACH), a physical broadcast channel (PBCH), and the like.

In addition, the data channel includes a physical downlink shared channel (PDSCH), a physical uplink shared channel (PUSCH), and the like.

Note that the reference signal includes a demodulation reference signal (DMRS), a sounding Reference Signal (SRS), a phase tracking reference signal (PTRS), a channel state information-reference signal (CSI-RS), a radio link monitoring-reference signal (RLM-RS), and a beam failure detection-reference signal (BFD-RS). In addition, the signal can include a channel and a reference signal. In addition, the data may mean data transmitted via the data channel.

In the present embodiment, the radio reception unit 220 constitutes a reception unit that receives radio signals via the receive beams (RX #1 to Rx #n in FIG. 2). In addition, the radio reception unit 220 constitutes a reception unit that receives radio signals (DL signals) including component carriers (CCs) via the receive beams. That is, the UE 200 can also execute radio communication by simultaneously transmitting and receiving a plurality of carriers.

Note that the radio signals mentioned here may mean all or some of signals transmitted from a transmission antenna of the gNB 100A (or the gNB 100B) to the air or may mean all or some of signals included in a specific cell (or a cell group).

A cell detection unit 230 executes detection processing of a cell in which the UE 200 resides and a peripheral cell. Note that the cell in which the UE 200 resides may be called an own cell or a serving cell according to a connection state of the UE 200. In addition, the peripheral cell may be referred to as an adjacent cell or a neighboring cell (of the own cell).

Specifically, the cell detection unit 230 detects a cell ID and the like based on an SSB and the like transmitted from the cell.

A monitoring and measuring unit 240 executes radio link monitoring and processing related to measurement in each layer. The radio link monitoring (RLM) corresponds to radio link monitoring defined in 3GPP TS 38.133. Specifically, the RLM may include the following monitoring.

Primary Cell (PCell) of stand-alone NR, NR-NR dual connectivity (NR-DC), and NR-E-UTRA dual connectivity (NE-DC) operation mode Primary SCell (PSCell) of NR-DC and E-UTRA-NR dual connectivity (EN-DC) operation mode In order to detect DL radio link quality of the PCell and the PSCell, the monitoring and measuring unit 240 monitors the DL radio link quality based on a reference signal of configured RLM-RS resources. The configured RLM-RS resources may be all SSBs, all CSI-RSs, or mixtures of SSBs and CSI-RSs. Note that the monitoring and measuring unit 240 does not need to execute the RLM outside an active DL bandwidth part (BWP).

In addition, in particular, in the present embodiment, the monitoring and measuring unit 240 executes various measurements for an upper layer, specifically, layer 3 (L3). For example, the monitoring and measuring unit 240 executes measurement of reference signal received power (RSRP) (L3-RSRP), and the like. Note that reference signal received quality (RSRQ) or signal-to-interference plus noise power ratio (SINR) may be included.

A control unit 250 controls each functional block constituting the UE 200. In particular, in the present embodiment, the control unit 250 executes control regarding a plurality of receive beams.

Specifically, the control unit 250 can independently control two or more receive beams. The independent control mentioned here includes directing each of the receive beams to a different direction at the same time. For example, like Rx #1 and Rx #n illustrated in FIG. 2, a direction to which a receive beam of Rx #1 is directed is physically different from a direction to which a receive beam of Rx #n is directed. Therefore, the UE 200 can simultaneously receive DL signals coming from different places (directions), specifically, gNBs (cells).

In addition, the control unit 250 can also control a single receive beam or a plurality of receive beams in a state where the receive beams are directed to the same direction, similar to the Release 15. That is, the control unit 250 can control the receive beams in a state (first state) where the receive beams are directed to the same direction or a state (second state) where each of the receive beams is directed to a different direction at the same time.

That is, the control unit 250 can control the receive beams in the first state or in the second state where the control of the receive beams is different from that of the first state.

(2.1) Cell Detection, Upper Layer (L3) Measurement, and RLM

In a case where the control unit 250 controls the receive beams in the state (second state) where each of the receive beams is directed to the different direction at the same time, the control unit 250 can shorten at least any one of a cell detection time and a measurement time in an upper layer, as compared with a case where the control unit 250 controls the receive beams in the state (first state) where the receive beams are directed to the same direction.

Here, the upper layer may mean a layer (L3 or higher) higher than L1 (PHY) and L2 (medium access control (MAC), radio link control (RLC) or the like).

In addition, in the case where the control unit 250 controls the receive beams in the state (second state) where each of the receive beams is directed to the different direction at the same time, the control unit 250 may simultaneously execute cell detection or measurement for the upper layer (L3) (L3 measurement) and radio link monitoring (RLM) or detection regarding the beam.

The detection regarding the beam may include at least any one of candidate beam detection (CBD) or beam failure detection (BFD). The candidate beam detection is detection of a beam that can be used for beam failure recovery (BFR), and the BFD is detection of a beam failure.

In addition, in the case where the control unit 250 controls the receive beams in the state (second state) where each of the receive beams is directed to the different direction at the same time, the control unit 250 may simultaneously execute cell detection, measurement in the upper layer, or radio link monitoring (RLM), and channel transmission/reception.

The channel mentioned here may include the control channel and the data channel described above. Specifically, the channel may include PUCCH/PUSCH/SRS or PDCCH/PDSCH/tracking reference signal (TRS)/CSI-RS for a channel quality indicator (CQI).

In addition, in the case where the control unit 250 controls the receive beams in the state (second state) where each of the receive beams is directed to the different direction at the same time, the control unit 250 may direct a different receive beam to each of a plurality of radio link monitoring (RLM)-reference signals (RLM-RSs).

Note that specific operation examples regarding the cell detection, the upper layer (L3) measurement, and the RLM will further be described later.

(2.2) Beam Management

In the case where the control unit 250 controls the receive beams in the state (second state) where each of the receive beams is directed to the different direction at the same time, the control unit 250 can execute received power measurement using an SSB by simultaneously using the plurality of receive beams.

Note that the SSB is an abbreviation for the synchronization signal (SS)/PBCH block, as described above, but may be called a synchronization signal block or may be interpreted as a kind of reference signal (RS).

Specifically, the received power measurement may mean reference signal received power (RSRP), that is, received power of a reference signal. Specifically, the received power measurement means RSRP measurement (L1-RSRP measurement) in Layer 1 based on the SSB, as described above.

In addition, in the case where the control unit 250 controls the receive beams in the state (second state) where each of the receive beams is directed to the different direction at the same time, the control unit 250 may simultaneously execute the received power measurement using a channel state information-reference signal, specifically, an CSI-RS for a plurality of component carriers (CC).

In addition, in the case where the control unit 250 controls the receive beams in the state (second state) where each of the receive beams is directed to the different direction at the same time, the control unit 250 may simultaneously execute channel transmission and reception and received power measurement.

The channel mentioned here may include PUCCH/PUSCH/SRS or PDCCH/PDSCH/TRS/CSI-RS for a CQI, as described above.

In addition, the received power measurement executed simultaneously with the channel transmission and reception may be L1-RSRP measurement using an SSB or L1-RSRP measurement using a CSI-RS.

In addition, in the case where the control unit 250 controls the receive beams in the state (second state) where each of the receive beams is directed to the different direction at the same time, the control unit 250 may execute measurement using a beam failure detection (BFD)-reference signal (BFD-RS) by simultaneously using the plurality of receive beams.

Note that the BFD-RS may be any one of an SSB or a CSI-RS configured as a BFD-RS.

In addition, in the case where the control unit 250 controls the receive beams in the state (second state) where each of the receive beams is directed to the different direction at the same time, the control unit 250 may simultaneously execute the measurement using the BFD-RS and channel transmission and reception.

The channel mentioned here may also include PUCCH/PUSCH/SRS or PDCCH/PDSCH/TRS/CSI-RS for a CQI.

Note that a specific operation example regarding beam management will further be described later.

(2.3) CA/DC

In a case where the control unit 250 controls the receive beams in the state (second state) where each of the receive beams is directed to the different direction at the same time and executes configuration regarding a secondary cell, the control unit 250 may direct at least one receive beam to the serving cell and direct another receive beam to a direction different from the serving cell.

Here, the secondary cell may include at least any one of PSCell and a secondary cell (SCell). In addition, the serving cell may include at least any one of PCell and PSCell.

In addition, the serving cell may be simply interpreted as a cell to which the UE 200 is being connected, but more strictly, in a case of a UE of radio resource control (RRC)_CONNECTED that is not configured together with carrier aggregation (CA), the number of serving cells constituting a primary cell is only one. In the case of the UE of the RRC_CONNECTED configured using the CA, the serving cell may be interpreted as indicating a set of one or more cells including the primary cell and all secondary cells.

In addition, in a case where the control unit 250 controls the receive beams in the state (second state) where each of the receive beams is directed to the different direction at the same time and executes configuration regarding the secondary cell in a specific frequency range (for example, FR2), the control unit 250 may execute measurement regarding the configuration using the plurality of receive beams.

The configuration regarding the secondary cell may include at least any one of addition of SCell (SCell addition) and activation of SCell (SCell activation).

In addition, the measurement regarding the configuration may include at least one of measurement for the upper layer (L3) (L3 measurement) and measurement in L1 (L1-RSRP measurement).

In addition, the control unit 250 may control the receive beams in the state (second state) where each of the receive beams is directed to the different direction at the same time and direct at least one receive beam to each of the component carriers (CCs).

That is, the plurality of receive beams may be directed to one CC, or in a case where a plurality of CCs are transmitted from different places (inter-band CA is assumed), the plurality of receive beams may be directed to the different directions.

(3) Operation of Radio Communication System

Next, an operation of the radio communication system 10 will be described. Specifically, an operation regarding radio resource management (RRM) of the UE 200 accompanying the independent control of the plurality of receive beams in FR2 will be described.

(3. 1) Problem

First, an RRM-related problem in a case where the UE 200 uses a single receive beam as in the Release 15 will be described.

When the UE 200 uses a single receive beam, for example, the following increase in the measurement time of the UE 200 or an operation restriction occurs.

In a case of executing L3 measurement (RSRP/RSRQ/SINR) of FR2, in addition to the number of measurement samples required to satisfy a measurement error provision being 3, it is assumed to execute switching of a receive beam eight times, and it is thus necessary to measure a total of 24 samples.

Note that in a case of FR1, the number of samples required to satisfy the measurement error provision is 5, and thus, there is a difference of about 5 times.

With respect to radio link monitoring of FR2, if an RLM-RS (RS that can be configured is an SSB or a CSI-RS, but refers to the SSB here) and an SSB for L3 measurement (actual measurement timing is configured by an SSB based RRM measurement timing configuration window (SMTC)) overlap with each other, only any one processing can be executed.

This is because directions of receive beams are different from each other in L3 measurement of the neighboring cell and an RLM-RS of the own cell. Note that in the case of FR1, such a state is not assumed, and thus, processing using the RLM-RS and the SSB for L3 measurement can be simultaneously executed.

Since directions of receive beams are different from each other in the SSB for L3 measurement and the other channels (PUCCH/PUSCH/SRS or PDCCH/PDSCH/TRS/CSI-RS for a CQI), it is necessary to switch the receive beams, such that the transmission and the reception of the data or the like become impossible in the symbols before and after the SSB to be measured (as described in FIG. 4).

Note that in the case of FR1, such a state is not assumed, and thus, the transmission and the reception of the data and the like are possible even in such symbols.

In a case of supporting inter-band CA/DC in FR2, if it is premised that the receive beams are directed to one direction at one time, a restriction that each CC should be transmitted from the same place (direction) even in an inter-band that spans a plurality of bands (frequency bands) occurs.

That is, in order to support the inter-band CA/DC, a terminal (UE) capable of independently directing a plurality of receive beams to different directions is required.

(3.2) Operation Example

Hereinafter, an operation example that can solve the problem described above will be described. Specifically, an operation example regarding the RRM of the UE 200 assuming that the UE 200 can independently direct the plurality of (two or more) receive beams to the different directions will be described. With such an operation example, efficient measurement due to shortening of the measurement time, or the like, and solving of a restriction on placement of the radio base station (gNB) or an antenna are realized.

The present operation example targets a terminal (UE) capable of independently controlling the plurality of (two or more) receive beams and directing the plurality of receive beams to the different directions, and clarifies a measurement delay, a measurement method, or a scheduling restriction in a case of executing measurement regarding any one of the following.

Cell detection/L3 measurement

Radio link monitoring (RLM)

Beam management

L1-RSRP measurement/report

Beam Failure Detection (BFD)/Candidate Beam Detection (CBD).

In addition, the present operation example also includes an operation at the time of carrier aggregation (CA) or dual connectivity (DC) by the terminal (UE) capable of independently directing the plurality of receive beams to the different directions.

(3.2.1) Operation Example 1 (Related to Cell Detection/L3 Measurement/RLM)

Operation example 1 relates to cell detection, L3 measurement, and RLM. FIG. 6 is a schematic operation flow of the UE 200 according to operation example 1.

As illustrated in FIG. 6, the UE 200 can shorten a time related to cell detection and/or L3 measurement in a case where the UE can independently control the plurality of receive beams (S10 and S20).

Specifically, the UE 200 may shorten a cell detection/L3 measurement time of the own cell and/or the peripheral cell more than that of a usual case. The normal case mentioned here is a case of using the single receive beam, that is, a case of the Release 15.

For example, in the case of the Release 15, as described above, it is assumed that the UE 200 switches the receive beam eight times and performs measurement, but in a case where the plurality of receive beams (for example, two receive beams) can be simultaneously directed to the different directions, it is only required to test reception four times in total, such that a measurement time is halved.

Alternatively, at the beginning of a measurement operation, the plurality of receive beams are simultaneously directed to the different directions and measurement is executed, but after a certain period of time (for example, after one sample measurement), only a receive beam in a direction in which a strong beam can be detected may be used, the other receive beams may be turned off, and the measurement may be continued.

In addition, the UE 200 may simultaneously execute cell detection/L3 measurement of the own cell and/or the peripheral cell and SSB-based or CSI-RS-based radio link monitoring in the own cell or CBD and/or BFD.

Specifically, in the Release 15, in a case where an SMTC (may be interpreted as an execution timing of cell detection/L3 measurement notified from a network) and an RLM-RS overlap with each other, only any one of the measurements can be executed, but in a case where the plurality of receive beams can be simultaneously directed to the different directions, both of the measurements may be simultaneously executed.

More specifically, a scaling factor defined on the assumption of the restriction described above, such as $K_{layer1\_measurement}$ defined in Chapter 9 of 3GPP TS38.133 may be set to 1.

In addition, the UE 200 may simultaneously execute cell detection/L3 measurement of the cell and/or the peripheral cell, RLM in the own cell, and channel transmission and reception in the own cell (PUCCH/PUSCH/SRS or PDCCH/PDSCH/TRS/CSI-RS for a CQI).

Specifically, the UE 200 executes all the operations without switching the receive beam during such an operation.

Therefore, a scheduling restriction on an SSB and one symbols before and after the SSB that occurs when channel transmission and reception collide with the SSB for L3 measurement is solved. In addition, a scheduling restriction on symbols of an RLM-RS that occurs when channel transmission and reception collide with the RLM-RS (SSB or CSI-RS) is also solved.

In addition, the UE 200 may direct different receive beams to each configured RLM-RS regarding the RLM in the own cell. Therefore, occurrence of a radio link failure (RLF) can be suppressed.

The UE 200 executes a cell detection and measurement operation adapted in a case of using the plurality of such receive beams (S30).

(3.2.2) Operation Example 2 (Related to Beam Management)

Operation example 2 relates to beam management. FIG. 7 is a schematic operation flow of the UE 200 according to operation example 2.

As illustrated in FIG. 7, the UE 200 can execute RSRP measurement in L1, specifically, L1-RSRP measurement by simultaneously using the plurality of receive beams in a case where the UE 200 can independently control the plurality of receive beams (S110 and S120). In addition, the UE 200 can execute BFD and/or CBD by simultaneously using the plurality of receive beams (S130).

Specifically, the UE 200 may execute SSB-based L1-RSRP measurement by simultaneously using the plurality of receive beams.

For example, in FR2, in a case where there is one serving cell and all CCs in intra-band CA are transmitted from the same place, the number of times by which the receive beam is switched may be reduced from eight (for example, may be reduced to four, which is a half of eight).

In addition, regardless of inter-band CA or inter-band DC in FR2 or intra-band/inter-band, in a case where CCs are transmitted from different places, the UE 200 may direct one receive beam for each CC to allow the measurement to be simultaneously performed (in this case, switch the receive beam eight times for each CC).

In addition, the UE 200 may simultaneously execute CSI-RS based L1-RSRP measurement for a plurality of CCs.

Note that in the CSI-RS based L1-RSRP measurement, the assumption that the receive beam is not shaken (not switched) is defined. This is because a basic SSB and quasi co-location (QCL) type-D configuration are assumed. It is assumed that a CSI-RS associated with an SSB in which QCL Type-D is configured is used in each CC, and measurement can be simultaneously executed without shaking the receive beam. The quasi co-location (QCL) Type D is a kind of QCL provision defined in 3GPP 38.214 5.1.5 and indicating a relationship regarding radio parameters between two signals, and is defined as a spatial Rx parameter.

In addition, the UE 200 may simultaneously execute the channel (PUCCH/PUSCH/SRS or PDCCH/PDSCH/TRS/CSI-RS for a CQI) transmission and reception, and the L1-RSRP measurement (may be any one of the SSB-based L1-RSRP measurement and the CSI-RS based L1-RSRP measurement). Therefore, the scheduling restriction may be solved.

In addition, the UE 200 may execute measurement using the BFD-RS by simultaneously using the plurality of receive beams with respect to the BFD and/or the CBD. For example, in the SSB-based measurement, in a case where the UE 200 directs the plurality of receive beams (for example, two receive beam) to the different directions at the same time, the UE 200 is only required to test reception four times for each receive beam, such that a measurement time is halved.

In addition, the UE 200 may simultaneously execute the BFD-RS and the channel (PUCCH/PUSCH/SRS or PDCCH/PDSCH/TRS/CSI-RS for a CQI) transmission and reception in the own cell. Therefore, the scheduling restriction may be solved.

L1-RSRP measurement/reporting is for measuring the L1-RSRP value for each RS (transmission beam of each radio base station) set in the radio resource control layer (RRC).

A measurement period defines within how many immediately previous samples the L1-RSRP measurement needs to be completed for each reporting, and is defined as follows in consideration of the number of samples and a scaling factor (see 3GPP TS38.133 and TS38.214).

(In case of FR1):M×P×SSB/CSI-RS period (In case of FR2):M×N×P×SSB/CSI-RS period

M: number of samples used for measurement of L1-RSRP reporting

P: scaling factor considering duplication with SMTC and MG

N: scaling factor considering receive beam switching of UE

Tables 1 and 2 illustrate configuration examples of the measurement period depending on a condition and the numbers M and N of samples.

TABLE 1

| Condition | Number of samples |
| --- | --- |
| In case where timeRestrictionforChannelMeasurement is configured or in case of aperiodic CSI-RS | M = 1 |
| Case other than above | M = 3 ✕:It depends on UE whether to apply averaging on three samples |

TABLE 2

| Condition | Scaling factor accompanying receive beam switching of UE |
| --- | --- |
| CSI-RS based reporting | N = 1 |
| SSB based reporting | N = 8 |
| CSI-RS with repetition ON and number of CSI-RS resources < maxNumberRxBeam | cell (maxNumberRxBeam/number of CSI-RS resources) |

(3.2.3) Operation Example 3 (Operation at the Time of CA/DC)

Figure 8:
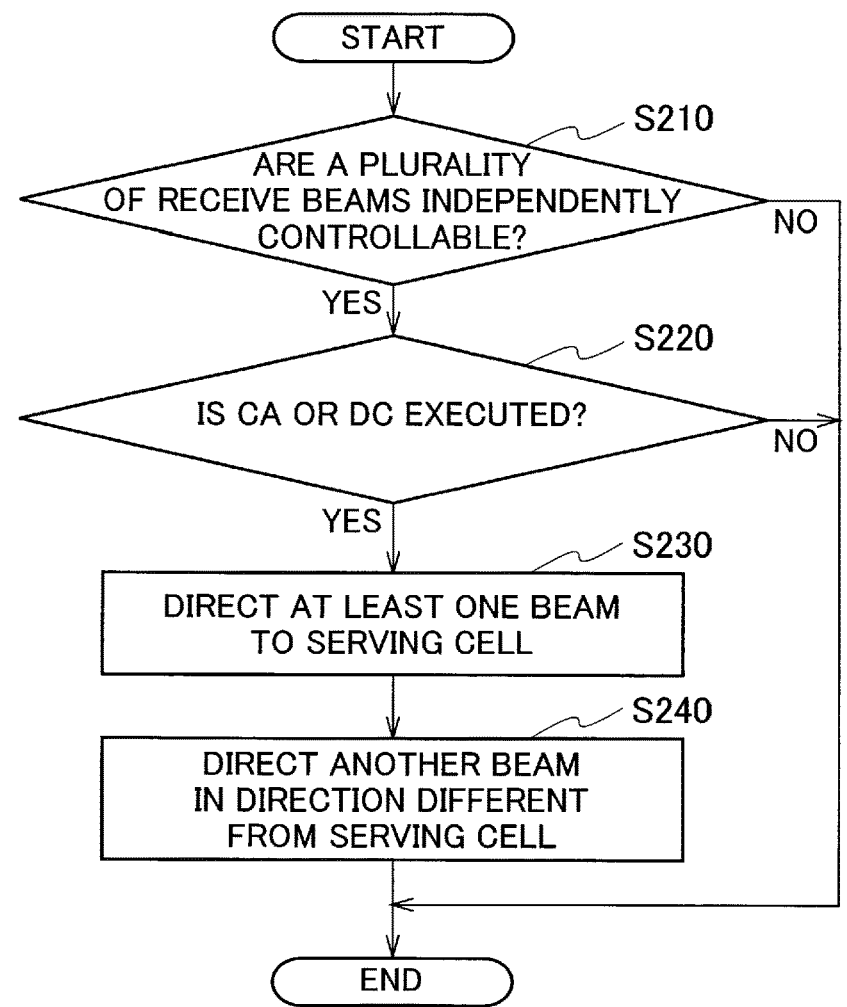
FIG. 8 is a schematic operation flow of the UE 200 according to operation example 3.

Operation example 3 relates to an operation at the time of CA/DC. FIG. 8 is a schematic operation flow of the UE 200 according to operation example 3.

As illustrated in FIG. 8, the UE 200 can direct at least one receive beam to the serving cell in a case where the UE 200 can independently control the plurality of receive beams and in a case where the UE 200 executes CA or DC (S210 to S230). In addition, the UE 200 can direct another receive beam to a direction different from the serving cell (S240).

Specifically, the UE 200 can operate as follows with respect to SCell in FR2 activation delay and/or PSCell addition delay for NR-NR DC in FR2.

In a case where the serving cell is configured to FR2, the UE 200 may direct at least one receive beam to PCell/PSCell of the serving cell and direct the other receive beams to a different direction (different CC) at the time of executing PSCell addition or SCell addition/activation.

Specifically, in a case where CCs including inter-band CA of FR2 are transmitted from different places (excluding a provision that it is assumed that the number of times by which the receive beam is switched is already 1), it may be assumed that the UE 200 directs at least one receive beam to each CC and switches each receive beam eight times.

Note that in a case where the number of simultaneous receive beams is three or more, the number of times may be reduced by scaling the number of times of switching in each CC by the receive beams.

In a case where the plurality of CCs are transmitted from the same place, the UE 200 may reduce the number of times by which the receive beam is switched in various measurements (L3 measurement or L1-RSRP measurement) required in the SCell activation of the FR2 to reduce a measurement time.

On the other hand, in a case where the serving cell is not configured to FR2, the UE 200 may reduce the number of times by which the receive beam is switched in various measurements (L3 measurement or L1-RSRP measurement) required in the SCell addition/activation of the FR2 by simultaneously using the plurality of receive beams to reduce a measurement time.

In addition, also with respect to measurement at the time of CA and DC, in a case where CCs including inter-band CA of FR2 are transmitted from different places (excluding a provision that it is assumed that the number of times by which the receive beam is switched is already 1), it may be assumed that the UE 200 directs one receive beam and switches each receive beam eight times.

Note that in a case where the number of simultaneous receive beams is three or more, the number of times may be reduced by scaling the number of times of switching in each CC by the receive beams.

(3.3) Others

In addition to the operation examples 1 to 3 described above, the following operation may further be applied to the independent control of the plurality of receive beams.

Specifically, the UE 200 may notify a network of the number of simultaneously controllable receive beams as UE capability (capability information). A timing of the notification may be before the start of control of the plurality of receive beams or may be a timing of the start of the control.

For example, the number of antenna panels mounted in the UE 200 or the number of controllable beams may be notified or may be notified for each band (frequency band).

In addition, it may be switched depending on a situation whether or not to simultaneously control the plurality of receive beams. For example, in the inter-band CA of FR2, the plurality of receive beams may be simultaneously used, and otherwise, only a single receive beam may be used in a conventional manner.

Alternatively, the UE 200 may divert a receive beam used for measurement (use a single receive beam) in a case of executing the measurement for a cell or a beam that has been measured immediately before. In addition, the switching of the receive beam may be notified from the network.

In addition, an application of the operation example described above may be classified based on a receive beam forming method (the number of antenna panels, or the like) of the UE 200.

For example, an application of the operation example described above may be classified into the following three patterns.

Figure 9A:
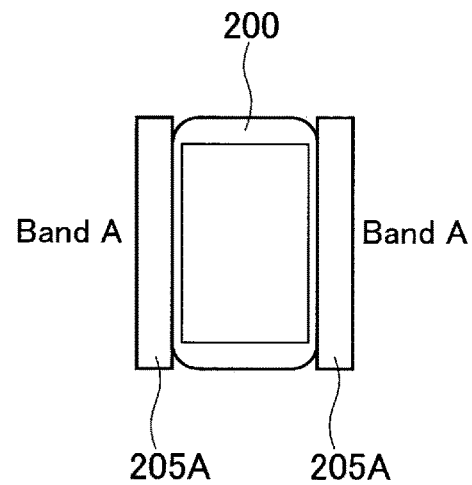
FIG. 9A is a view illustrating a mounted example of an antenna panel of the UE 200 corresponding to pattern 1.

(Pattern 1): Mounted with two antenna panels and forming two or more receive beams per band (Pattern 2): Mounted with two antenna panels and forming one receive beam per band (Pattern 3): Mounted with one antenna panel and forming receive beams of a plurality of bands FIG. 9A illustrates a mounted example of an antenna panel of the UE 200 corresponding to pattern 1. As illustrated in FIG. 9A, the UE 200 is mounted with two antenna panels, specifically, two antenna panels 205A, and the antenna panels 205A correspond to one band (Band A). It should be noted that the antenna panels 205A and 205B are schematically illustrated, and sizes and mounted positions of the antenna panels are different from actual sizes and mounted positions.

Figure 9B:
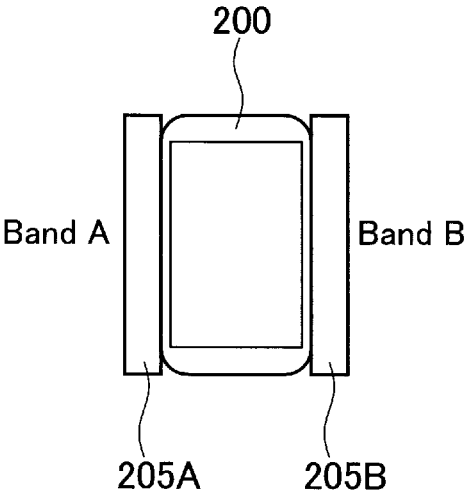
FIG. 9B is a view illustrating a mounted example of an antenna panel of the UE 200 corresponding to pattern 2.

FIG. 9B illustrates a mounted example of an antenna panel of the UE 200 corresponding to pattern 2. As illustrated in FIG. 9B, the UE 200 is mounted with an antenna panel 205A and an antenna panel 205B, and the antenna panels 205A and 205B correspond to different bands (Band A and Band B).

Figure 9C:
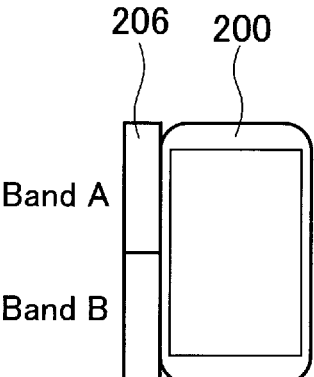
FIG. 9C is a view illustrating a mounted example of an antenna panel of the UE 200 corresponding to pattern 3.

FIG. 9C illustrates a mounted example of an antenna panel of the UE 200 corresponding to pattern 3. As illustrated in FIG. 9C, the UE 200 is mounted with an antenna panel 206, and the antenna panel 206 corresponds to a plurality of bands (Band A and Band B).

In a case of the UE 200 of pattern 1, all of the operation examples 1 to 3 described above may be applied.

In a case of the UE 200 of pattern 2, some of the operation examples 1 to 3 described above are applied. For example, the scheduling restriction may be solved by executing L3 measurement of the neighboring cell while continuing data transmission and reception in the serving cell. On the other hand, the number of times of switching of the receive beam is not changed from that of the Release 15, and an operation regarding the switching of the receive beam is thus similar to that of the Release 15.

Also in a case of the UE 200 of pattern 3, some of the operation examples 1 to 3 described above are applied. For example, the scheduling restriction may be solved by executing L3 measurement of the neighboring cell while continuing data transmission and reception in the serving cell. On the other hand, an operation regarding the switching of the receive beam is similar to that of the Release 15.

Figure 10A:
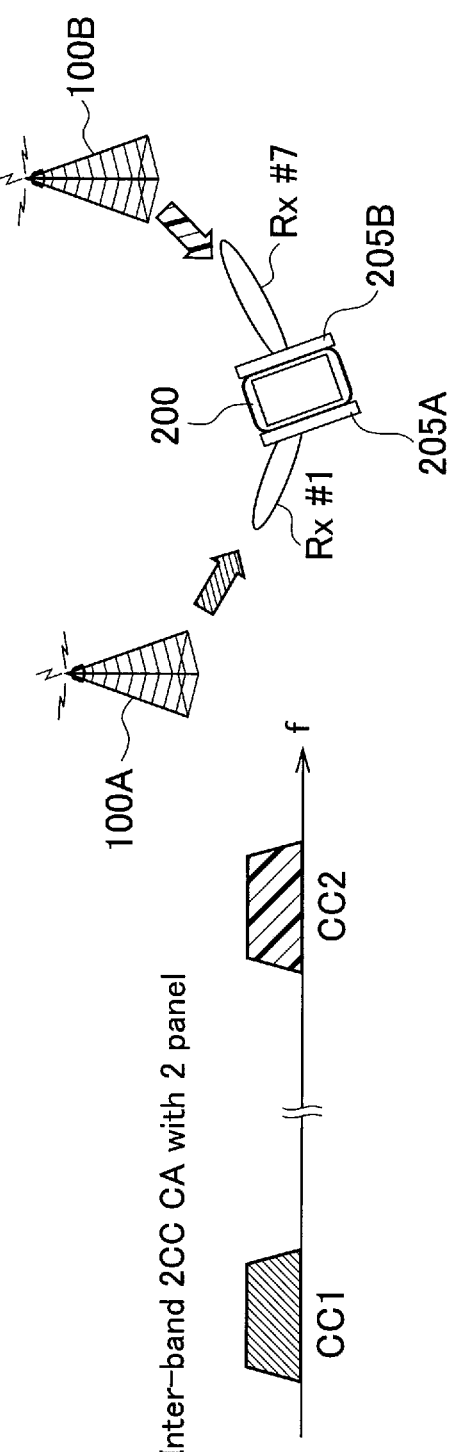
FIG. 10A is a diagram illustrating a control example (control example 1) of receive beams by the UE 200 mounted with a plurality of antenna panels.
Figure 10B:
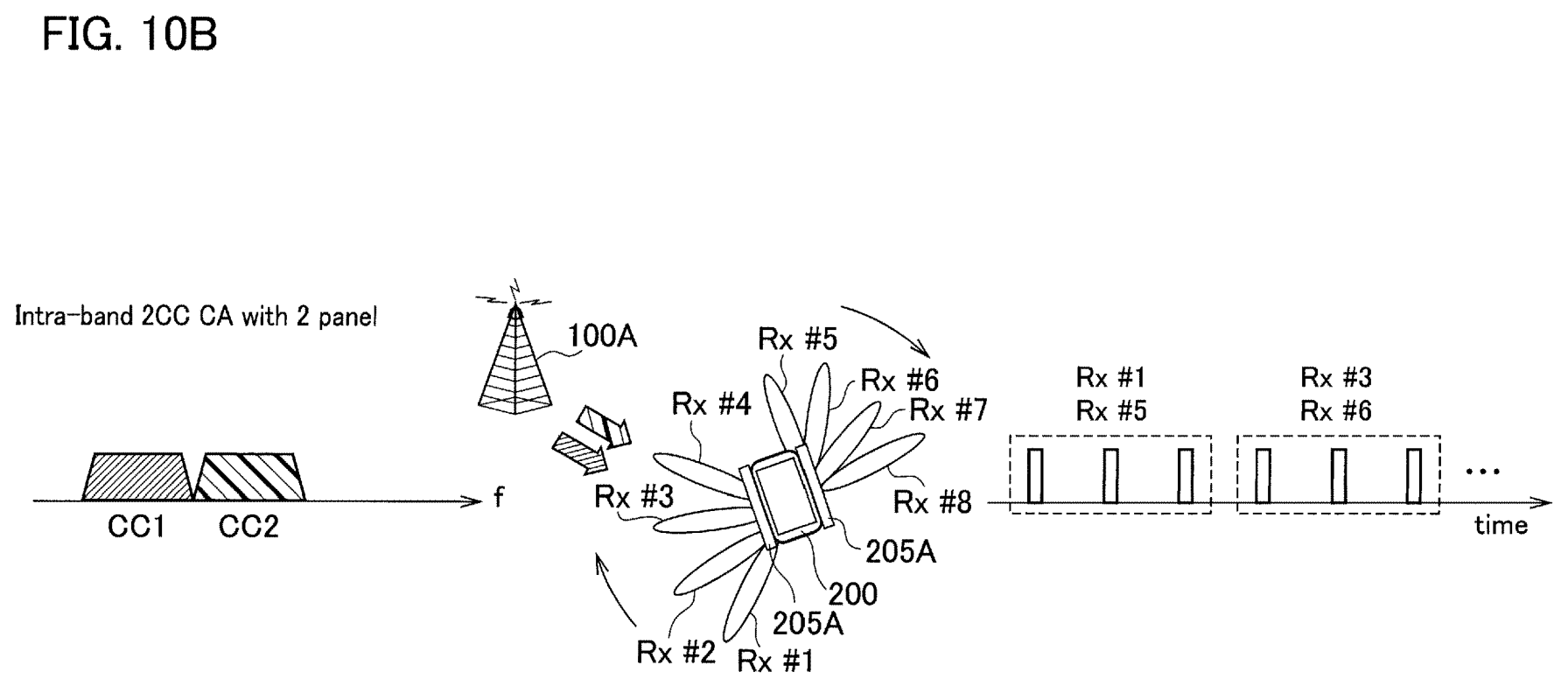

FIGS. 10A and 10B illustrate control examples of receive beams by the UE 200 mounted with a plurality of antenna panels.

Specifically, FIG. 10A is an example of Inter-band CA in which two CCs are used, and the UE 200 is mounted with antenna panels 205A and 205B corresponding to different bands. As illustrated in FIG. 10A, the UE 200 directs receive beams to different directions using the antenna panels 205A and 205B and executes CA. At the time of measurement, each receive beam is shaken (switched) eight times in total.

FIG. 10B is an example of Intra-band CA in which two CCs are used, and the UE 200 is mounted with two antenna panels 205A corresponding to the same band. As illustrated in FIG. 10B, the UE 200 directs receive beams to different directions using two antenna panels 205A. In FIG. 10B, an example in which measurement is performed four times using each antenna panel 205A is illustrated. That is, the UE 200 can test reception by two receive beams in one measurement.

(4) Action and Effect

According to the embodiment described above, the following effects can be obtained. Specifically, with respect to the cell detection, the upper layer (L3) measurement, and the RLM, in a case where the UE 200 controls the receive beams in the state (second state) where each of the receive beams is directed to the different direction at the same time, the UE 200 can shorten at least any one of a cell detection time and a measurement time in the upper layer, as compared with a case where the UE 200 controls the receive beams in the state (first state) where the receive beams are directed to the same direction.

In addition, the UE 200 can simultaneously execute the cell detection or the L3 measurement and the RLM or the beam failure detection (BFD). Furthermore, the UE 200 can simultaneously execute the cell detection, the L3 measurement, or the RLM, and the channel transmission/reception, and can also direct different receive beams to each of the RLM-RSs.

With such an operation of the UE 200, the cell detection and the measurement processing in the upper layer can be efficiently performed.

With respect to beam management, the UE 200 can execute the received power measurement (RSRP measurement) using the SSB by simultaneously using the plurality of receive beams.

In addition, the UE 200 can simultaneously execute the received power measurement using the CSI-RS for the plurality of CCs, and can also simultaneously execute the channel transmission and reception and the received power measurement. Furthermore, the UE 200 can also execute the measurement using the BFD-RS by simultaneously using the plurality of receive beams, and can simultaneously execute the measurement using the BFD-RS and the channel transmission and reception.

With such an operation of the UE 200, the scheduling constraint can be solved and the measurement processing can be efficiently performed.

With respect to CA/DC, the UE 200 can direct at least one receive beam to the serving cell and direct another receive beam in the different direction from the serving cell, in a case of executing configuration regarding the secondary cell.

In addition, in a case where the UE 200 executes configuration regarding the secondary cell in a specific frequency range (for example, FR2), the UE 200 can execute measurement regarding the configuration using the plurality of receive beams. Furthermore, the UE 200 can also direct at least one receive beam to each of the CCs.

With such an operation of the UE 200, it is possible to efficiently perform the configuration and measurement processing regarding CA/DC.

That is, according to the UE 200 corresponding to the operation examples 1 to 3 described above, even in a case of independently controlling the plurality of receive beams and directing each receive beam to the different direction, efficient operation such as measurement can be realized.

(5) Other Embodiments

Although the contents of the present invention have been described hereinabove with reference to the embodiments, it is obvious to those skilled in the art that the present invention is not limited to these descriptions, and can be variously modified and improved.

For example, the operation in FR2 has been mainly described in the embodiment described above, but all or some of the operation examples 1 to 3 described above may be applied to another frequency range (FR) as long as beamforming is applied.

Moreover, the block diagram used for explaining the embodiments (FIG. 5) illustrates blocks of functional unit. Those functional blocks (components) can be realized by a desired combination of at least one of hardware and software. A method for realizing each functional block is not particularly limited. That is, each functional block may be realized by one device combined physically or logically. Alternatively, two or more devices separated physically or logically may be directly or indirectly connected (for example, wired, or wireless) to each other, and each functional block may be realized by these plural devices. The functional blocks may be realized by combining software with the one device or the plural devices mentioned above.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, a functional block (component) that causes transmitting may be called a transmitting unit or a transmitter. For any of the above, as explained above, the realization method is not particularly limited to any one method.

Figure 11:
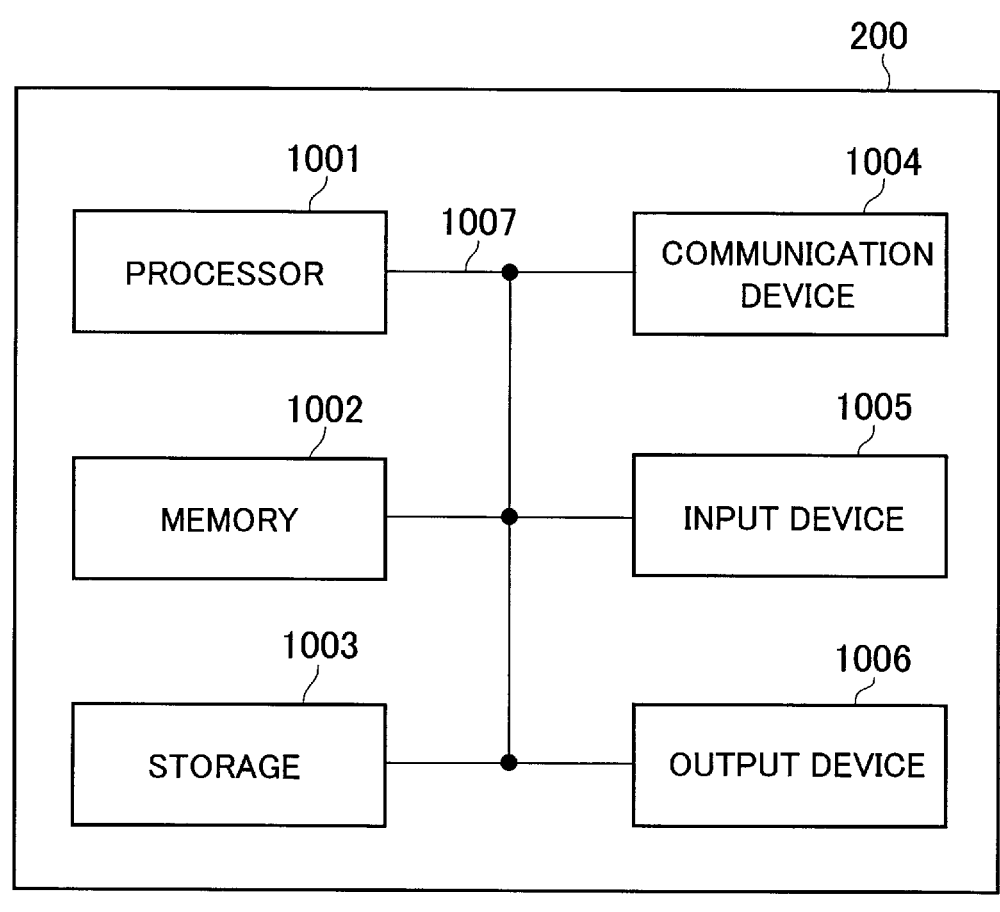
FIG. 11 is a diagram illustrating an example of a hardware configuration of the UE 200.

Furthermore, the UE 200 explained above can function as a computer that performs the processing of the radio communication method of the present disclosure. FIG. 11 is a diagram illustrating an example of a hardware configuration of the UE 200. As illustrated in FIG. 11, the UE 200 can be configured as a computer device including a processor 1001, a memory 1002, a storage 1003, a communication device 1004, an input device 1005, an output device 1006, a bus 1007, and the like.

Furthermore, in the following explanation, the term "device" can be replaced with a circuit, device, unit, and the like. Hardware configuration of the device can be constituted by including one or plurality of the devices illustrated in the figure, or can be constituted by without including a part of the devices.

The functional blocks (see FIG. 5) of the UE 200 can be realized by any of hardware elements of the computer device or a desired combination of the hardware elements.

Moreover, the processor 1001 performs computing by loading a predetermined software (program) on hardware such as the processor 1001 and the memory 1002, and realizes various functions of the UE 200 by controlling communication via the communication device 1004, and controlling reading and/or writing of data on the memory 1002 and the storage 1003.

The processor 1001, for example, operates an operating system to control the entire computer. The processor 1001 can be configured with a central processing unit (CPU) including an interface with a peripheral device, a control device, a computing device, a register, and the like.

Moreover, the processor 1001 reads a program (program code), a software module, data, and the like from the storage 1003 and/or the communication device 1004 into the memory 1002, and executes various processes according to the data. As the program, a program that is capable of executing on the computer at least a part of the operation explained in the above embodiments is used. Alternatively, various processes explained above can be executed by one processor 1001 or can be executed simultaneously or sequentially by two or more processors 1001. The processor 1001 can be implemented by using one or more chips. Alternatively, the program can be transmitted from a network via a telecommunication line.

The memory 1002 is a computer readable recording medium and is configured, for example, with at least one of Read Only Memory (ROM), Erasable Programmable ROM (EPROM), Electrically Erasable Programmable ROM (EEPROM), Random Access Memory (RAM), and the like. The memory 1002 can be called register, cache, main memory, and the like. The memory 1002 can store therein a program (program codes), software modules, and the like that can execute the method according to the embodiment of the present disclosure.

The storage 1003 is a computer readable recording medium. Examples of the storage 1003 include an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The communication device 1004 includes a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information thereamong. The bus 1007 can be constituted by a single bus or can be constituted by separate buses between the devices.

Further, the device is configured to include hardware such as a microprocessor, a digital signal processor (Digital Signal Processor: DSP), Application Specific Integrated Circuit (ASIC), Programmable Logic Device (PLD), and Field Programmable Gate Array (FPGA). Some or all of these functional blocks may be realized by the hardware. For example, the processor 1001 may be implemented by using at least one of these hardware.

Notification of information is not limited to that explained in the above aspect/embodiment, and may be performed by using a different method. For example, the notification of information may be performed by physical layer signaling (for example, Downlink Control Information (DCI), Uplink Control Information (UCI), upper layer signaling (for example, RRC signaling, Medium Access Control (MAC) signaling, broadcast information (Master Information Block (MIB), System Information Block (SIB)), other signals, or a combination of these. The RRC signaling may be called RRC message, for example, or can be RRC Connection Setup message, RRC Connection Reconfiguration message, or the like.

Each of the above aspects/embodiments can be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

As long as there is no inconsistency, the order of processing procedures, sequences, flowcharts, and the like of each of the above aspects/embodiments in the present disclosure may be exchanged. For example, the various steps and the sequence of the steps of the methods explained above are exemplary and are not limited to the specific order mentioned above.

The specific operation that is performed by the base station in the present disclosure may be performed by its upper node in some cases. In a network constituted by one or more network nodes having a base station, the various operations performed for communication with the terminal may be performed by at least one of the base station and other network nodes other than the base station (for example, MME, S-GW, and the like may be considered, but not limited thereto). In the above, an example in which there is one network node other than the base station is explained; however, a combination of a plurality of other network nodes (for example, MME and S-GW) may be used.

Information and signals (information and the like) can be output from an upper layer (or lower layer) to a lower layer (or upper layer). It may be input and output via a plurality of network nodes.

The input/output information can be stored in a specific location (for example, a memory) or can be managed in a management table. The information to be input/output can be overwritten, updated, or added. The information can be deleted after outputting. The inputted information can be transmitted to another device.

The determination may be made by a value (0 or 1) represented by one bit or by Boolean value (Boolean: true or false), or by comparison of numerical values (for example, comparison with a predetermined value).

Each aspect/embodiment described in the present disclosure may be used separately or in combination, or may be switched in accordance with the execution. In addition, notification of predetermined information (for example, notification of "being X") is not limited to being performed explicitly, it may be performed implicitly (for example, without notifying the predetermined information).

Instead of being referred to as software, firmware, middleware, microcode, hardware description language, or some other name, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, when a software is transmitted from a website, a server, or some other remote source by using at least one of a wired technology (coaxial cable, fiber optic cable, twisted pair, Digital Subscriber Line (DSL), or the like) and a wireless technology (infrared light, microwave, or the like), then at least one of these wired and wireless technologies is included within the definition of the transmission medium.

Information, signals, or the like mentioned above may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

It should be noted that the terms described in this disclosure and terms necessary for understanding the present disclosure may be replaced by terms having the same or similar meanings. For example, at least one of a channel and a symbol may be a signal (signaling). Also, a signal may be a message. Further, a component carrier (Component Carrier: CC) may be referred to as a carrier frequency, a cell, a frequency carrier, or the like.

The terms "system" and "network" used in the present disclosure can be used interchangeably.

Furthermore, the information, the parameter, and the like explained in the present disclosure can be represented by an absolute value, can be expressed as a relative value from a predetermined value, or can be represented by corresponding other information. For example, the radio resource can be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (Base Station: BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to with the terms such as a macro cell, a small cell, a femtocell, or a pico cell.

The base station can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a part or all of the coverage area of a base station and/or a base station subsystem that performs communication service in this coverage.

In the present disclosure, the terms "mobile station (Mobile Station: MS)", "user terminal", "user equipment (User Equipment: UE)", "terminal" and the like can be used interchangeably.

The mobile station is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

At least one of a base station and a mobile station may be called a transmitting device, a receiving device, a communication device, or the like. Note that, at least one of a base station and a mobile station may be a device mounted on a moving body, a moving body itself, or the like. The moving body may be a vehicle (for example, a car, an airplane, or the like), a moving body that moves unmanned (for example, a drone, an automatically driven vehicle, or the like), a robot (manned type or unmanned type). At least one of a base station and a mobile station can be a device that does not necessarily move during the communication operation. For example, at least one of a base station and a mobile station may be an Internet of Things (IoT) device such as a sensor.

Also, a base station in the present disclosure may be read as a mobile station (user terminal, hereinafter the same). For example, each of the aspects/embodiments of the present disclosure may be applied to a configuration that allows a communication between a base station and a mobile station to be replaced with a communication between a plurality of mobile stations (for example, may be referred to as Device-to-Device (D2D), Vehicle-to-Everything (V2X), or the like). In this case, the mobile station may have the function of the base station. Words such as "uplink" and "downlink" may also be replaced with wording corresponding to inter-terminal communication (for example, "side"). For example, terms an uplink channel, a downlink channel, or the like may be read as a side channel.

Likewise, a mobile station in the present disclosure may be read as a base station. In this case, the base station may have the function of the mobile station.

A radio frame may be configured with one or a plurality of frames in a time domain. One frame or each of the plurality of frames in the time domain may be referred to as a subframe.

The subframe may also be configured with one or a plurality of slots in the time domain. The subframe may have a fixed time length (for example, 1 ms) that does not depend on a numerology.

The numerology may be a communication parameter applied to at least one of transmission and reception of a certain signal or channel. The numerology may indicate at least one of, for example, a subcarrier spacing (SCS), a bandwidth, a symbol length, a cyclic prefix length, a transmission time interval (TTI), the number of symbols per TTI, a radio frame configuration, specific filtering processing performed by a transceiver in a frequency domain, a specific windowing processing performed by the transceiver in the time domain, and the like.

The slot may be configured with one or a plurality of symbols (Orthogonal Frequency Division Multiplexing (OFDM) symbols, Single Carrier Frequency Division Multiple Access (SC-FDMA) symbols, or the like) in the time domain. The slot may be a time unit based on a numerology.

The slot may include a plurality of minislots. Each minislot may be configured with one or a plurality of symbols in the time domain. In addition, the minislot may be referred to as a sub-slot. The minislot may be configured with a smaller number of symbols than that of the slot. A PDSCH (or PUSCH) transmitted in a time unit larger than the minislot may be referred to as PDSCH (or PUSCH) mapping type A. A PDSCH (or PUSCH) transmitted using the minislot may be referred to as PDSCH (or PUSCH) mapping type B.

All of the radio frame, the subframe, the slot, the minislot, and the symbol represent time units at the time of transmitting a signal. The radio frame, the subframe, the slot, the minislot, and the symbol may have different names corresponding thereto, respectively.

For example, one subframe may be referred to as a transmission time interval (TTI), a plurality of consecutive subframes may be referred to as a TTI, and one slot or one minislot may be referred to as a TTI. That is, at least one of the subframe and the TTI may be a subframe (1 ms) in the existing LTE, may be a period (for example, one to thirteen symbols) shorter than 1 ms, or may be a period longer than 1 ms. Note that a unit representing the TTI may be referred to as a slot, a minislot, or the like rather than the subframe.

Here, the TTI refers to, for example, a minimum time unit of scheduling in radio communication. For example, in an LTE system, a base station performs scheduling that allocates radio resources (frequency bandwidths, transmission power, and the like, that can be used in each user terminal) to each user terminal in a unit of the TTI. Note that a definition of the TTI is not limited thereto.

The TTI may be a transmission time unit of a channel-encoded data packet (transport block), a code block, a codeword, or the like, or may be a processing unit such as scheduling, link adaptation, or the like. Note that when the TTI is given, a time section (for example, the number of symbols) in which the transport block, the code block, the codeword, or the like is actually mapped may be shorter than the TTI.

Note that in a case where one slot or one minislot is referred to as the TTI, one or more TTIs (that is, one or more slots or one or more minislots) may be a minimum time unit of scheduling. In addition, the number of slots (number of minislots) constituting the minimum time unit of the scheduling may be controlled.

A TTI having a time length of 1 ms may be referred to as a normal TTI (TTI in LTE Rel. 8-12), a long TTI, a normal subframe, a long subframe, a slot, and the like. A TTI shorter than the normal TTI may be referred to as a shortened TTI, a short TTI, a partial or fractional TTI, a shortened subframe, a short subframe, a minislot, a subslot, a slot, and the like.

Note that the long TTI (for example, a normal TTI, a subframe or the like) may be replaced with a TTI having a time length exceeding 1 ms and the short TTI (for example, a shortened TTI or the like) may be replaced with a TTI having a TTI length shorter than that of the long TTI and having a TTI length of 1 ms or more.

A resource block (RB) is a resource allocation unit in the time domain and the frequency domain, and may include one or a plurality of continuous subcarriers in the frequency domain. The number of subcarriers included in the RB may be the same regardless of the numerology, and may be, for example, 12. The number of subcarriers included in the RB may be determined based on the numerology.

In addition, the time domain of the RB may include one or a plurality of symbols, and may have a length of one slot, one minislot, one subframe, or one TTI. One TTI, one subframe, and the like, may each be configured with one or a plurality of resource blocks.

Note that one or a plurality of RBs may be referred to as a physical resource block (Physical RB: PRB), a subcarrier group (Sub-Carrier Group: SCG), a resource element group (Resource Element Group: REG), a PRB pair, an RB pair, and the like.

In addition, the resource block may be configured with one or a plurality of resource elements (Resource Elements: RE). For example, one RE may be a radio resource area of one subcarrier and one symbol.

A bandwidth part (Bandwidth Part: BWP) (which may be referred to as a partial bandwidth or the like) may represent a subset of contiguous common resource blocks (RBs) for a certain numerology in a certain carrier. Here, the common RB may be specified by an index of RBs based on a common reference point of the carrier. The PRB may be defined in a certain BWP and be numbered within the BWP.

The BWP may include an UL BWP and a DL BWP. For the UE, one or a plurality of BWPs may be configured in one carrier.

At least one of the configured BWPs may be active, and it may not be assumed that the UE transmits and receives a predetermined signal/channel outside the active BWP. Note that a "cell", a "carrier", or the like in the present disclosure may be replaced with the "BWP".

The structures of the radio frame, the subframe, the slot, the minislot, the symbol, and the like, described above are merely examples. For example, a configuration such as the number of subframes included in the radio frame, the number of slots per subframe or radio frame, the number of minislots included in the slot, the number of symbols and RBs included in the slot or the minislot, the number of subcarriers included in the RB, the number of symbols in the TTI, the symbol length, and the cyclic prefix (CP) length can be variously changed.

The terms "connected", "coupled", or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access". In the present disclosure, two elements can be "connected" or "coupled" to each other by using one or more wires, cables, printed electrical connections, and as some non-limiting and non-exhaustive examples, by using electromagnetic energy having wavelengths in the radio frequency region, the microwave region and light (both visible and invisible) regions, and the like.

The reference signal may be abbreviated as Reference Signal (RS) and may be called pilot (Pilot) according to applicable standards.

As used in the present disclosure, the phrase "based on" does not mean "based only on" unless explicitly stated otherwise. In other words, the phrase "based on" means both "based only on" and "based at least on".

The "means" in the configuration of each of the above devices may be replaced with a "unit", a "circuit" a, "device", and the like.

Any reference to an element using a designation such as "first", "second", and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in some or the other manner.

In the present disclosure, the used terms "include", "including", and variants thereof are intended to be inclusive in a manner similar to the term "comprising". Furthermore, the term "or" used in the present disclosure is intended not to be an exclusive disjunction.

Throughout this disclosure, for example, during translation, if articles such as "a", "an", and "the" in English are added, in this disclosure, these articles shall include plurality of nouns following these articles.

The terms "determining" as used in this disclosure may encompass a wide variety of operations. The "determining" can include, for example, considering performing judging, calculating, computing, processing, deriving, investigating, looking up, search, or inquiry (for example, searching in a table, a database, or another data structure), or ascertaining as performing the "determining". In addition, the "determining" can include considering performing receiving (for example, receiving information), transmitting (for example, transmitting information), input, output, or accessing (for example, accessing data in a memory) as performing the "determining". In addition, the "determining" can include considering performing resolving, selecting, choosing, establishing, or comparing as performing the "determining". That is, the "determining" can include considering some operation as performing the "determining". In addition, the "determining" may be replaced with "assuming", "expecting", "considering", and the like.

In the present disclosure, the term "A and B are different" may mean "A and B are different from each other". It should be noted that the term may mean "A and B are each different from C". Terms such as "leave", "coupled", or the like may also be interpreted in the same manner as "different".

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

REFERENCE SIGNS LIST

10 Radio communication system
20 NG-RAN
100A, 100B gNB
200 UE
205A, 205B, 206 Antenna panel
210 Radio transmission unit

220 Radio reception unit
230 Cell detection unit
240 Monitoring and measuring unit
250 Control unit
1001 Processor
1002 Memory
1003 Storage
1004 Communication device
1005 Input device
1006 Output device
1007 Bus

The invention claimed is:

1. A terminal comprising:
a receiver that receives a plurality of synchronization signal blocks from a base station; and
a processor that simultaneously performs reception power measurement using the plurality of synchronization signal blocks.

2. The terminal according to claim 1, wherein
the receiver receives a first synchronization signal block and a second synchronization signal block from different directions; and
the processor simultaneously executes in the different directions:
a first received power measurement using the first synchronization signal block; and
a second received power measurement using the second synchronization signal block.

3. The terminal according to claim 1, further comprising:
a transmitter that transmits information indicating a number of received power measurements that can be performed simultaneously, to the network.

4. A terminal comprising:
a receiver that receives a plurality of beam failure detection-reference signals from a base station; and
a processor that simultaneously executes measurements using the plurality of beam failure detection-reference signals.

5. The terminal according to claim 4, wherein
the receiver receives a first beam failure detection-reference signal and a second beam failure detection-reference signal from different directions; and
the processor simultaneously executes in the different directions:
a first measurement using the first beam failure detection-reference signal, and
a second measurement using the second beam failure detection-reference signal.

* * * * *